(12) United States Patent
Ray et al.

(10) Patent No.: US 9,760,654 B2
(45) Date of Patent: Sep. 12, 2017

(54) METHOD AND SYSTEM FOR FOCUSED MULTI-BLOCKING TO INCREASE LINK IDENTIFICATION RATES IN RECORD COMPARISON

(71) Applicant: Wal-Mart Stores, Inc., Bentonville, AR (US)

(72) Inventors: Andrew Benjamin Ray, Bentonville, AR (US); Nathaniel Philip Troutman, Seattle, WA (US)

(73) Assignee: WAL-MART STORES, INC., Bentonville, AR (US)

( * ) Notice: Subject to any disclaimer, the term of this patent is extended or adjusted under 35 U.S.C. 154(b) by 613 days.

(21) Appl. No.: 13/871,885

(22) Filed: Apr. 26, 2013

(65) Prior Publication Data
US 2014/0324906 A1 Oct. 30, 2014

(51) Int. Cl.
*G06F 17/30* (2006.01)
(52) U.S. Cl.
CPC .............................. *G06F 17/30958* (2013.01)
(58) Field of Classification Search
CPC .................. G06F 3/064; G06F 3/0644; G06F 2212/1044; G06F 17/30442
USPC ................ 707/737, E17.014, 692, E17.005, 707/E17.046, 741, 722, 769, 791, 792, 707/999.005, E17.001, E17.002, E17.044, 707/E17.045, E17.048, E17.051, E17.054, 707/E17.055, E17.083, 690, 695, 718, 707/747, 752, 780, 796, 797, 809, 822, 707/827, 999.002, 999.003, 999.102; 709/224, 215, 226; 706/12, 46, 48, 52
See application file for complete search history.

(56) References Cited

U.S. PATENT DOCUMENTS

| | | | |
|---|---|---|---|
| 5,497,486 A | 3/1996 | Stolfo | |
| 5,710,915 A | 1/1998 | McElhiney | |
| 5,819,291 A | 10/1998 | Haimowitz | |
| 6,009,424 A | 12/1999 | Lepage et al. | |
| 6,122,628 A | 9/2000 | Castelli et al. | |
| 6,175,835 B1 | 1/2001 | Shadmon | |
| 6,208,993 B1 | 3/2001 | Shadmon | |
| 6,336,117 B1 | 1/2002 | Massarani | |
| 6,865,577 B1 | 3/2005 | Sereda | |
| 6,978,458 B1 | 12/2005 | Ghosh et al. | |
| 6,988,093 B2 | 1/2006 | Pic | |
| 7,152,060 B2 | 12/2006 | Borthwick | |

(Continued)

FOREIGN PATENT DOCUMENTS

WO 2007081925 7/2007

*Primary Examiner* — Jay Morrison
*Assistant Examiner* — Ken Hoang
(74) *Attorney, Agent, or Firm* — Bryan Cave LLP (57) ABSTRACT

Techniques for comparing customer records to identify linked customer records pertaining to a single customer entity are provided. The techniques include identifying a target group of electronic customer records having data fields containing data pertaining to a customer, identifying one or more focused blockers identifying a data value for an electronic customer record data field, and analyzing the target group of electronic customer records to identify a focused group of electronic customer records containing the focused blocker data value. The techniques also include comparing pairs of electronic customer records from the focused group of electronic customer records to identify linked records which pertain to a single customer entity.

21 Claims, 8 Drawing Sheets

(56) References Cited

U.S. PATENT DOCUMENTS

| | | |
|---|---|---|
| 7,403,942 B1 * | 7/2008 | Bayliss ............ G06F 17/30303 |
| | | 707/748 |
| 7,519,635 B1 | 4/2009 | Haustein |
| 7,549,052 B2 | 6/2009 | Haitsma |
| 7,886,124 B2 | 2/2011 | Muthulingam |
| 7,899,796 B1 | 3/2011 | Borthwick |
| 7,921,086 B1 | 4/2011 | Bromley |
| 8,015,163 B2 | 9/2011 | Welingkar |
| 8,127,109 B2 | 2/2012 | Matze |
| 8,204,867 B2 | 6/2012 | Benhase |
| 8,234,468 B1 | 7/2012 | Deshmukh |
| 8,275,770 B2 | 9/2012 | Bayliss |
| 8,359,337 B2 * | 1/2013 | Anumakonda et al. ...... 707/802 |
| 8,364,652 B2 | 1/2013 | Vijayan |
| 8,364,677 B2 | 1/2013 | Brodfuehrer |
| 8,645,399 B2 | 2/2014 | McNeill |
| 2002/0169934 A1 | 11/2002 | Krapp |
| 2003/0097359 A1 | 5/2003 | Ruediger |
| 2004/0172393 A1 | 9/2004 | Kazi |
| 2004/0215640 A1 | 10/2004 | Bamford et al. |
| 2006/0248048 A1 | 11/2006 | Jain |
| 2008/0005141 A1 | 1/2008 | Zheng |
| 2008/0098083 A1 | 4/2008 | Shergill |
| 2010/0174688 A1 | 7/2010 | Anumakonda et al. |
| 2012/0084268 A1 | 4/2012 | Vijayan |
| 2013/0173560 A1 | 7/2013 | McNeill et al. |
| 2013/0212103 A1 * | 8/2013 | Cao et al. ..................... 707/737 |
| 2013/0238627 A1 * | 9/2013 | Qian ................ G06F 17/30864 |
| | | 707/741 |

* cited by examiner

METHOD AND SYSTEM FOR FOCUSED MULTI-BLOCKING TO INCREASE LINK IDENTIFICATION RATES IN RECORD COMPARISON

BACKGROUND INFORMATION

Field of the Disclosure

The present invention relates to computerized record processing systems and more particularly to techniques for focused multi-blocking to increase link identification rates in comparing customer records.

Background

The computation time required for processing certain types of data objects is high and increases dramatically as the number of objects increases. For example, comparing records to link associated records requires comparing a pair of records. Each such comparison is computationally expensive as it requires significant processing time. Additionally, as the number records increases, the number of comparisons that need to be conducted may grow exponentially. Comparing records to identify associated records requires significant computing power and is a slow process.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages. In selected examples, a computer-readable medium may comprise any non-transitory medium that can contain, store, communicate, propagate, or transport the program for use by or in connection with the instruction execution system, apparatus, or device.

Examples may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on one or more clients, servers, or combinations or sub-combinations thereof. In selected embodiments, one or more clients and servers may be positioned remotely with respect to one another. Accordingly, such nodes may be connected to one another through any type of network, including a local area network (LAN) or a wide area network (WAN), or the connection may be made through the Internet using an Internet Service Provider.

Figure 1:
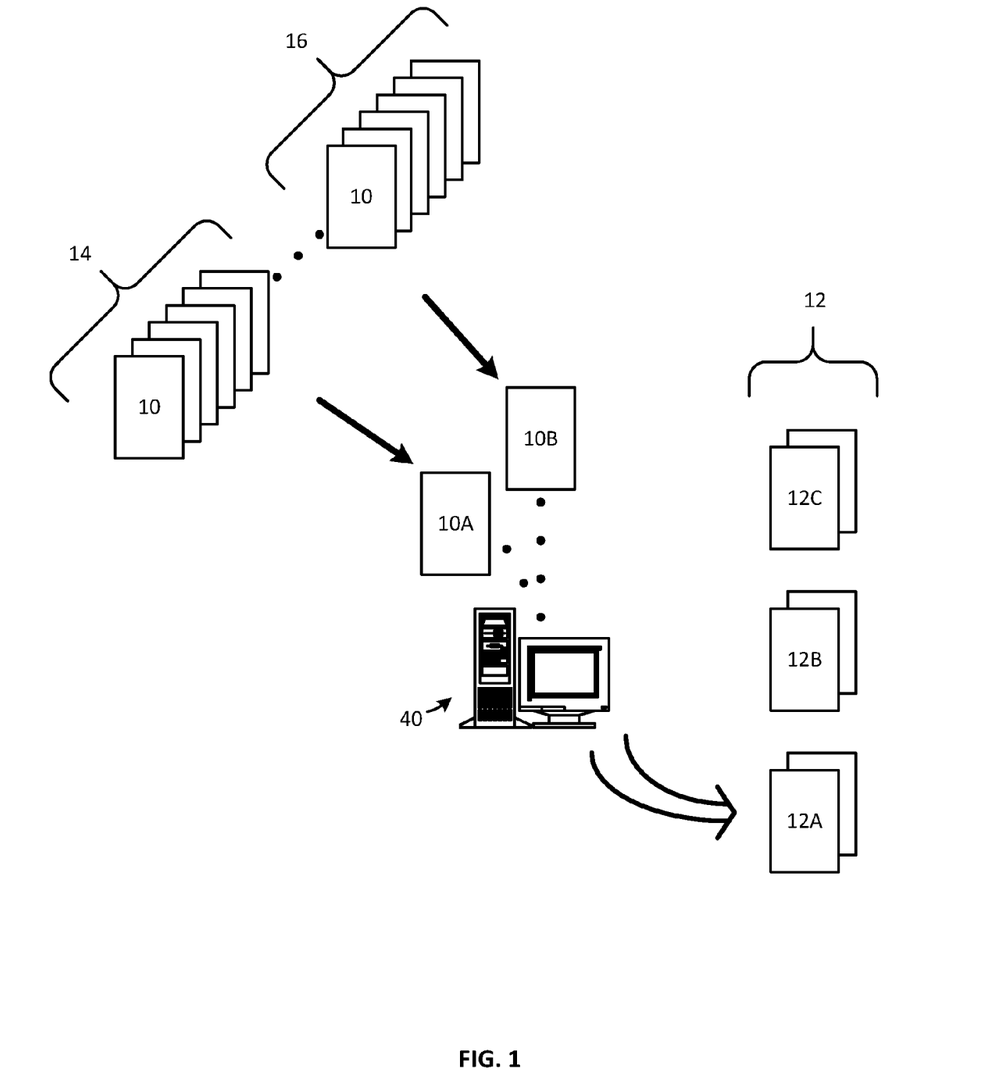
FIG. 1 is a schematic drawing of a computer system used to compare and link customer records.

Referring to FIG. 1, an example computer system 40 may utilize focused multi-blocking to increase the rate of identifying linked records 12A, 12B, 12C among customer records 10 while reducing the computational time required to analyze the records 10. In one example, stores may generate many customer records 10. Multiple entry points where customers may provide information and create a customer record 10 may create multiple groups 14, 16 of customer records and may create many instances where multiple records 10 belong to the same customer. A computer system 40 may be used to analyze the customer records 10 and identify links between records; identifying linked records 12A, 12B, 12C which belong to the same customer.

Identifying linked customer records allows the computer system 40 to create a more complete understanding of customer preferences, history, etc. This allows the computer system to tailor promotions or communications to better match the customer preferences and allow a store to better serve the customers.

A brute force comparison of the customer records requires significant computational time and is not practical. Each record must be compared with every other record to determine if these belong to the same person. A brute force comparison of N records requires $N^2$ comparisons. Each comparison of a pair of customer records requires comparison of multiple data fields within each record.

Rather than performing such a brute force comparison, a computer system 40 may analyze the customer records 10 using a focused multi-blocking technique. Rather than randomly select records 10A, 10B to compare and analyze, the computer system may systematically select records according to algorithms which provide an increased likelihood of identifying linked records 12. The computer system 40 may apply focused multi-blocking to the records 10 to identify records for comparison. Blocking assigns a key to a customer record 10 based on attributes of that record. Blocking assigns a key to the record 10 based on data found within the record which is associated with the customer who created the record 10. For example, a block of 'zip code' may be applied to a record 10, and records with the same zip codes would receive a block key identifying the zip code, grouped, and be compared to determine if these records belong to the same customer.

The computer system applies focused blocks to the records 10 which may each contain multiple blocks. For example, a focused block of 'zip code' and 'double metaphone of last name' may be applied to the records and may return, for each record 10, a block key of (double metaphone; zip code). Double metaphone is an algorithm which converts a name into a simplified phonetic representation. The computer system 40 may then compare records 10A, 10B which contain the same zip code and phonetically equivalent last names. Such records 10A, 10B are much more likely to be linked records than records chosen at random. Moreover, the computer system 40 may perform comparisons of the records 10 using multiple different focused blocks, referred to as focused multi-blocking. In this manner, records are compared using multiple different focused blocks and the likelihood of identifying the linked records 12 is high while the likelihood of not identifying linked records 12 present in the customer records 10 is low.

Computational time is saved by performing focused multi-blocking. For N records, brute force analysis would perform $N^2$ comparisons. If a focused block resulting in N/2 records is used for comparing records 10, $(N/2)^2$ comparisons ($1/4*N^2$ comparisons) are performed. One quarter as many comparisons are performed. If two comparisons using different focused block are performed, $1/2*N^2$ comparisons are performed. If three comparisons using different focused block are performed, $3/4*N^2$ comparisons are performed. Many focused blocks will result in less than N/2 associated records. It can be seen that even where two, three, or more focused blocks are used in comparing the records 10, fewer comparisons may be performed than would be necessary to simply compare all records 10 using brute force.

Figure 2:
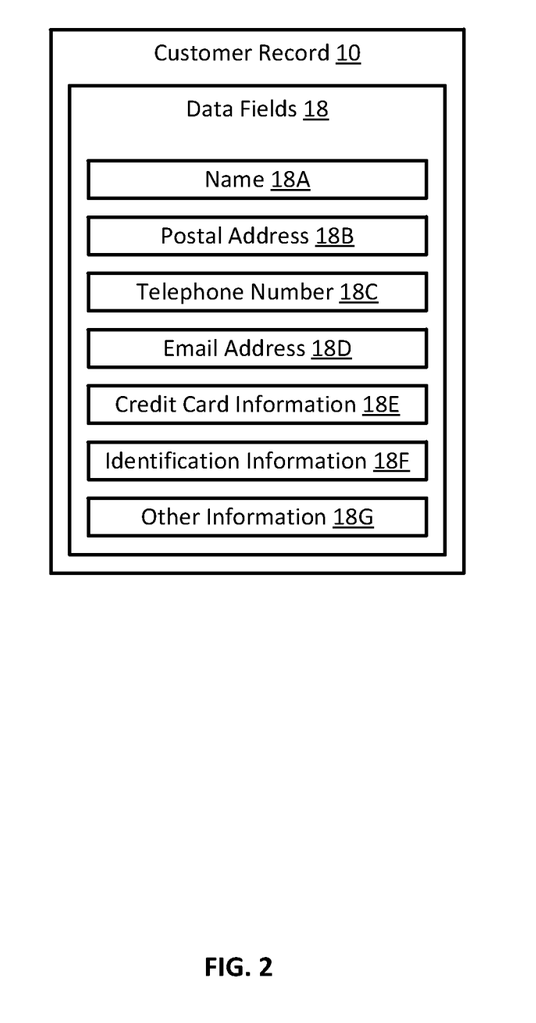
FIG. 2 is a schematic drawing of a customer record.

Referring to FIG. 2, computerized records 10 processed by a computer system 40 may have any suitable form or content. In selected examples, records 10 may correspond to the activities of a business, information related to a business, activities of customers of one or more businesses, information related to customers of one or more businesses, or the like or a combination or sub-combination thereof. For example, records 10 may correspond to or comprise customer profiles.

A computerized record 10 may include or contain one or more data fields 18. The nature of the data fields 18 may correspond to the nature or purpose of a record. For example, a record 10 that is embodied as a store customer record 10 or customer profile may include one or more data fields 18 populated with contact information, demographic information, geographic information, and psychographic characteristics, buying patterns, creditworthiness, purchase history, or the like or a combination or sub-combination thereof. Accordingly, in one example, a record 10 may include or contain data fields 18 populated with one or more names 18A, postal addresses 18B, telephone numbers 18C, email addresses 18D, credit card information 18E (e.g., codes or index information corresponding to credit card data), identification information 18F (e.g., account numbers, customer numbers, membership numbers, or the like), other information 18G as desired or necessary, or the like.

Records 10 in accordance with the present invention may be processed in any suitable manner. In selected embodiments, it may be desirable to identify one or more links between two or more records 10 to identify linked records 12. This may allow a store to better serve its customers. The store may better identify a customer's purchasing habits and may offer discounts or promotions which are better suited to a particular customer.

Figure 3:
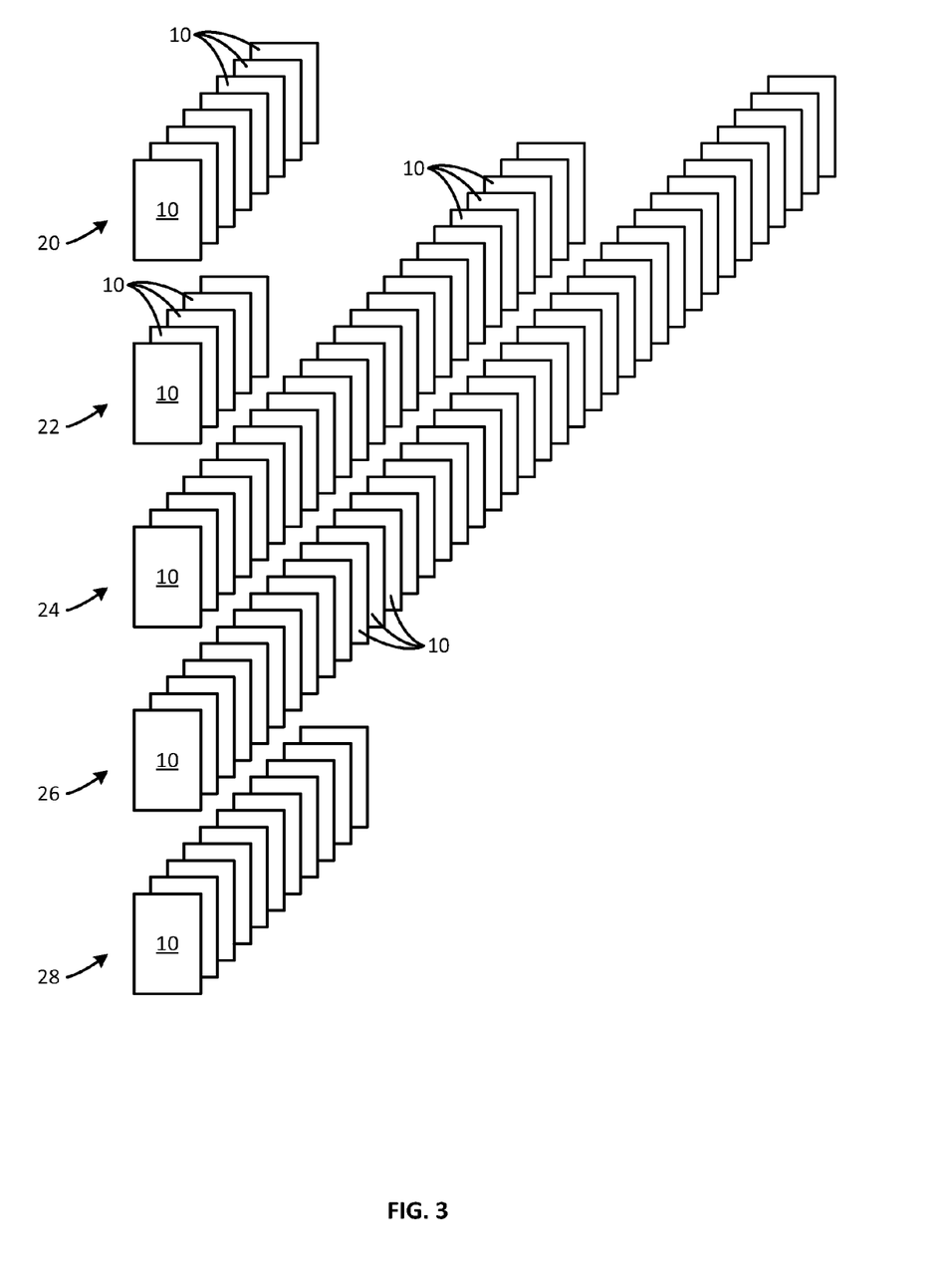
FIG. 3 is a schematic drawing of groups of customer records.

As indicated in FIG. 3, customer records 10 corresponding to customer profiles associated with a single customer may be generated by different sources. Multiple customer records 10 may be related in other ways, such as pertaining to the same household or business. Accordingly, records 10 may be compared to identify those that correspond to the same individual, family, household, business, or the like. Such customer records 10 may then be linked 12, enabling greater benefit to be obtained thereby. Linked records may be generally referred to as pertaining to the same customer entity. In this manner, a customer entity may refer to a customer, a household, a business, etc.

For example, a group 20 of records 10 may correspond to online purchases. A group 22 of records 10 may correspond to online profiles created on a store website. A group 24 of records 10 may correspond to membership in a warehouse club. Still another group 26 of records 10 may correspond to purchases in a brick-and-mortar retail store. Another group 28 of records 10 may correspond to entry into a promotion. Selected customers and/or households may correspond to records 10 from one or more such sources, and may correspond to multiple records within any of such sources. However, there may not be any hard link (e.g., unifying or universal identification number) linking such records 10 together as belonging to a single customer. Moreover, it may be desirable to associate records together within a selection larger than a single customer, such as by linking records which are associated with a single household or business. Accordingly, fuzzy logic may be used to identify those records 10 that correspond to the same individual, household, or the like. Once linked together, those linked records 12 may provide a more complete picture of the individual or household and, as a result, be more useful to the store in serving the customer.

Figure 4:
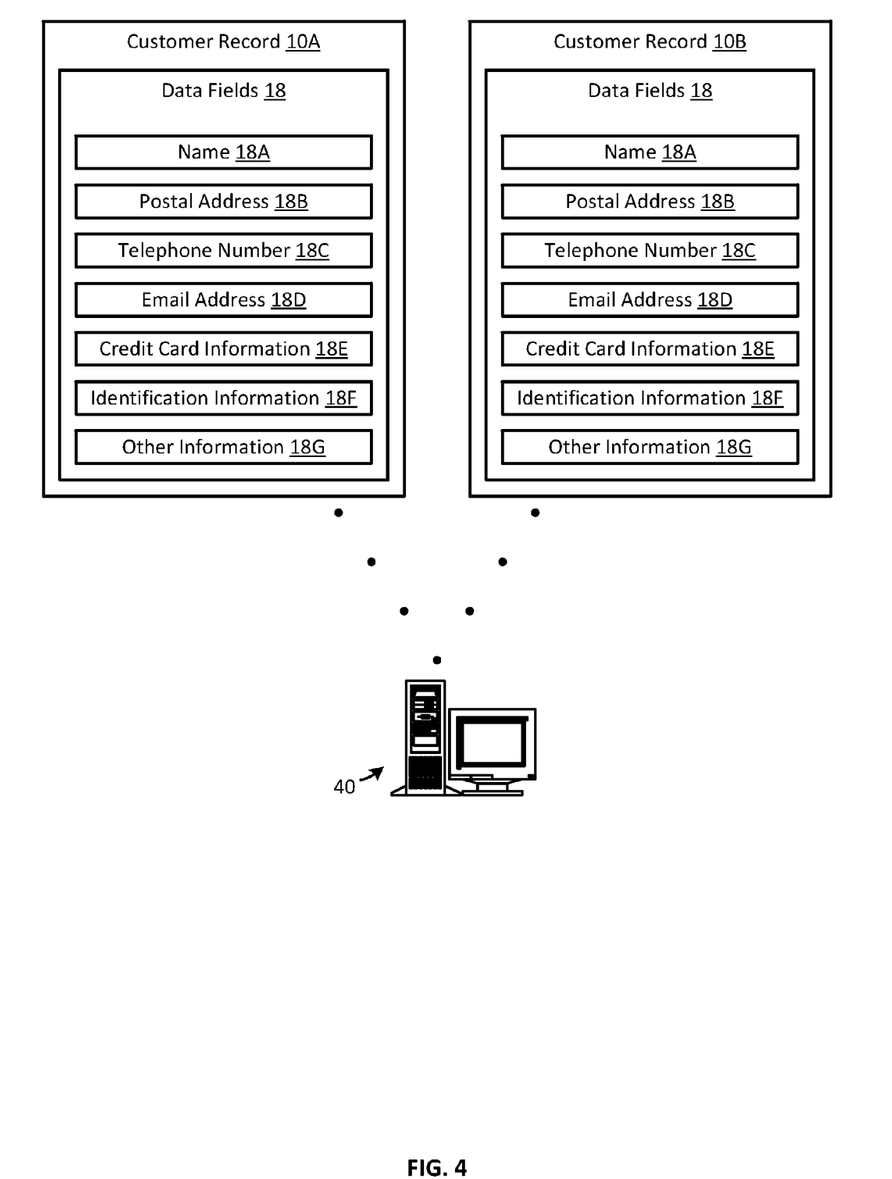
FIG. 4 is a schematic drawing of a computer comparing customer records.

Referring to FIG. 4, linking two or more records 10 together may require comparing pairs of records 10A, 10B. As the number records 10 increases, the number of comparisons may grow exponentially. Moreover, each comparison of two records 10A, 10B may be computationally expensive as it may require comparison of one, multiple, or all data fields 18 within the records 10A, 10B. Accordingly, the computer system 40 may employ focused multi-blocking in order to limit the number of comparisons which are performed and efficiently process one or more large groups of records 10 (e.g., one or more of groups 20, 22, 24, 26, 28). In many examples, it may desirable to compare all available records 10 from all groups 20, 22, 24, 26, 28 to identify linked records 12.

Figure 5:
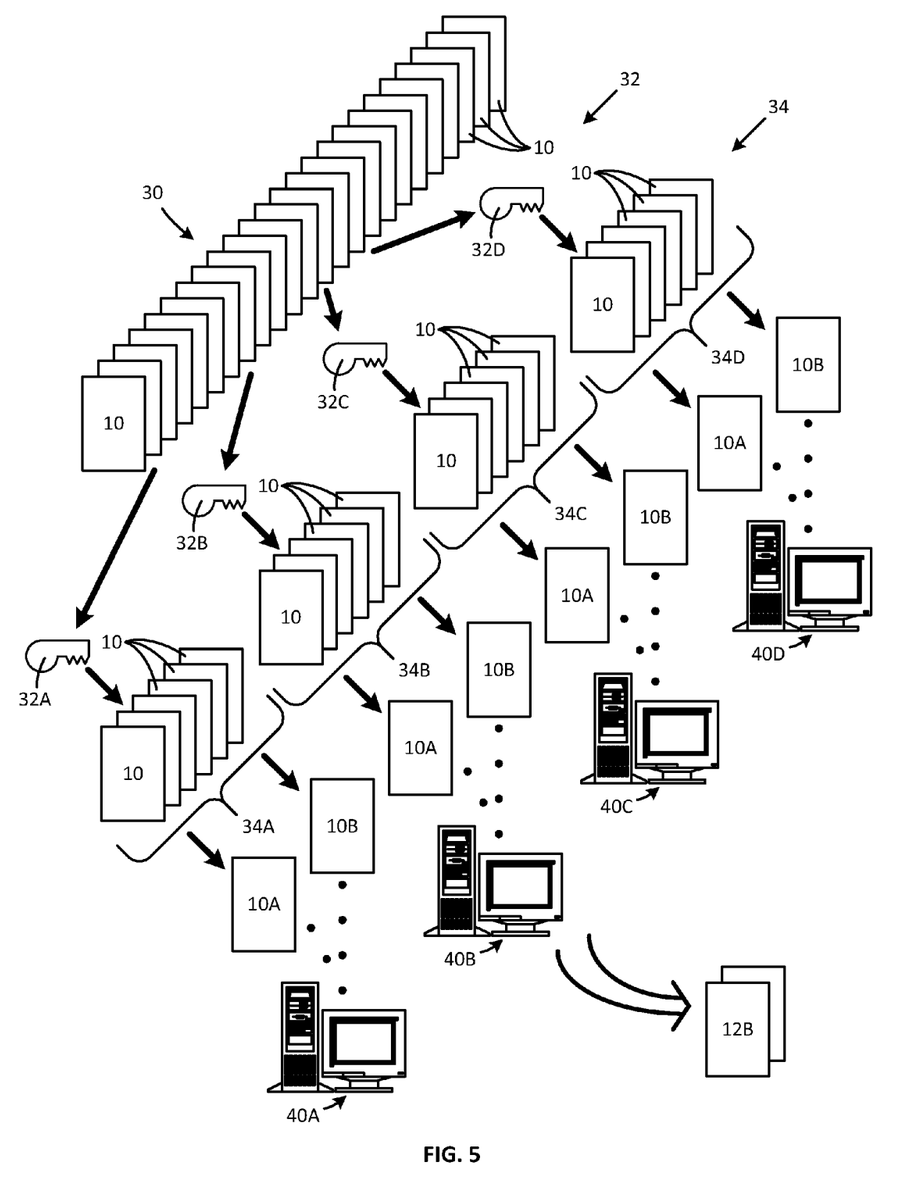
FIG. 5 is a schematic drawing of groups of customer records and a computer system.

As illustrated in FIG. 5, the computer system 40 may control the number of comparisons which are performed on a target group 30 of records 10 by applying a focused blocker to the records 10 to produce block keys 32 and separate the group 30 of records 10 into a plurality of smaller focused groups 34 of records 10. Focused blocking may include assigning one or more keys 32 to each record 10 based on one or more data attributes thereof and responsive to one or more focused blockers. For example, if each record 10 of a group 30 corresponds to or comprises a customer profile, focused blocking may comprise assigning a key 32 to each record 10 based on customer attributes such as zip code and first letter of last name, etc. as well as combinations thereof. Comparisons may then only be made between records 10A, 10B corresponding to the same focused group 34, thereby reducing the total number of comparisons that need to be performed and increasing the likelihood that any comparison returns linked records 12.

Since comparisons between records 10 are independent (e.g., can be conducted without inter-process communication), record linkage may be performed in a parallel computing environment. Accordingly, one or more computer systems 40 may compare records 10A, 10B from the focused groups 34. For example, a computer system 40B may compare records 10A, 10B from focused group 34B, resulting in linked records 12B. Moreover, multiple computer systems 40 may be used to accomplish different aspects of comparing the records 10.

For example, one computer system 40 may generate or provide the focused blockers. One or more other computer systems 40 may receive one or more focused blockers and process the group of records 30 according to the focused blockers to produce focused block keys 32A, 32B, 32C, 32D associated with the records 10 and to generate focused record groups 34A, 34B, 34C, 34D. One or more other computer systems 40A, 40B, 40C, 40D, may process records 10A, 10B, from the focused groups 34A, 34B, 34C, 34D to identify linked records 12. In this manner, multiple computer systems 40 may be used to quickly and efficiently process a large target group 30 of records 10 to identify linked records 12.

When each record 10 is first processed (e.g., in a first pass), a computer system 40 may generate tuples comprising or identifying a focused block key 32 and a corresponding record 10. Records 10 may then be grouped based on the block keys 32 assigned thereto. In a second pass, a computer system 40 may take the focused groups 34 of records 10 and compare pairs of records from the focused group 34 to identify linked records 12. Multiple focused block keys 32 may be used according to the requirements in comparing the records 10. According to the types of linked records 12 which should be identified, one or more focused blockers resulting in one or more focused block keys 32 may be used in comparing the target group 30 of records 10.

In one example, the following focused blockers may be used: Double metaphone of last name+Zip code, Last name+Zip code, Last name+House Number, House Number+Zip code, Phone Number, and Email. Application of these focused blockers to a customer record may produce blocking keys associated with that customer record 10. For example, a customer record 10 associated with a customer George Smith may include data such as the customer name, George Smith, his address in zip code 90210, and other data associated with that customer. Application of a focused blocker 'last name+zip code' may produce associated blocking key values 'Smith, 90210.' These blocking key values may be concatenated into 'Smith; 90210' and this blocking key may be associated with the customer record. If the customer has two addresses entered in the customer record 10, the blocker may result in two blocking key values; 'Smith; 90210' and 'Smith; 84110'.

Likewise, where multiple blockers are used in analyzing the customer records, the customer record 10 belonging to George Smith may be analyzed with respect to any other focused blocker and may produce additional blocking keys which become associated with that record. A desired list or group of focused blockers may be applied to a target group 30 of customer records 10 and may result in zero or more block keys associated with each customer record 10. The computer system 40 may then emit key value pairs of (block key; customer record) for each customer record producing block keys. These key value pairs may be grouped by block key into focused groups 34. For each group 34, the customer system 40 may compare each possible pair of customer records 10 within the focused group 34 and identify linked records 12.

Focused multi-blocking may allow for efficient comparison of records 10 and may facilitate the more specific use of these records 10. Where a store has locations throughout a country, focused multi-blocking may allow for easy records linking within a targeted location. A focused block key 32 may allow for comparison of records pertaining to downtown San Francisco or to Montana. Comparison of records 10 may be easily performed based on particular needs with significantly reduced computational requirements.

Figure 6:
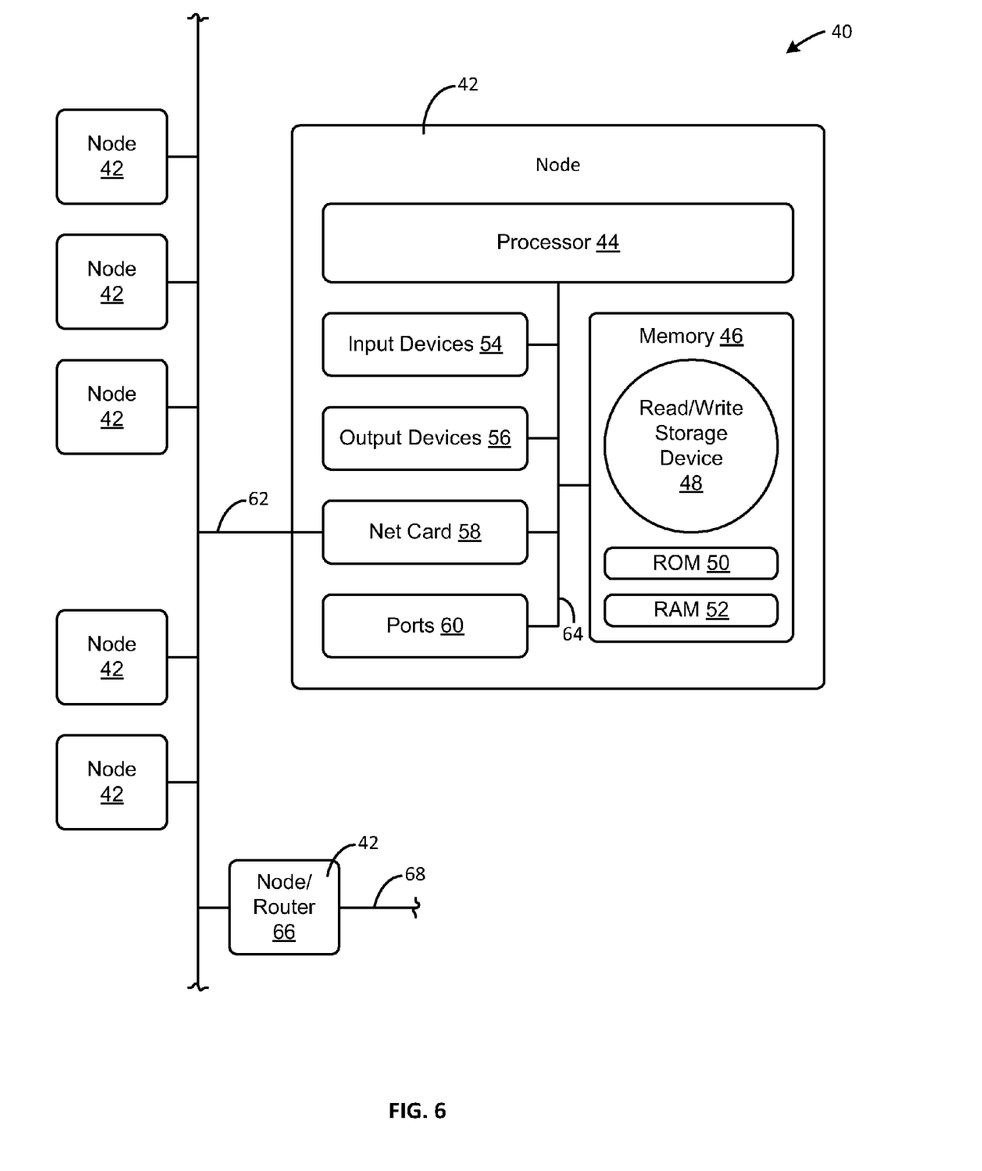
FIG. 6 is a schematic drawing of a computer system.

Referring to FIG. 6, a computer system 40 may provide, enable, or support focused multi-blocking, parallelization, or the like in any suitable manner. A computer system 40 may be embodied as hardware, software, or some combination thereof. In certain examples, a computer system 40 may comprise a single computer. In certain examples, a computer system 40 may comprise multiple processor units or multiple computers. For example, a computer system 40 may include one or more nodes 42.

A node 42 may include one or more processors 44, processor cores 44, or central processing units (CPUs) 44 (hereinafter "processors 44". Each such processor 44 may be viewed an independent computing resource capable of performing a processing workload distributed thereto. Alternatively, the one or more processors 44 of a node 42 may collectively form a single computing resource. Accordingly, individual workloads shares (e.g., group 30, focused group 34, records 10) may be distributed to nodes 42, to multiple processors 44 of nodes 42, or combinations thereof.

In selected examples, a node 42 may include memory 46. Such memory 46 may be operably connected to a processor 44 and include one or more devices such as a hard drive 48 or other non-volatile storage device 48, read-only memory (ROM) 50, random access memory (RAM) 52, or the like or a combination or sub-combination thereof. In selected examples, such components 44, 46, 48, 50, 52 may exist in a single node 42. Alternatively, such components 44, 46, 48, 50, 52 may be distributed across multiple nodes 42.

In selected examples, a node 42 may include one or more input devices 54 such as a keyboard, mouse, touch screen, scanner, memory device, communication line, and the like. A node 42 may also include one or more output devices 56 such as a monitor, output screen, printer, memory device, and the like. A node 42 may include a network card 58, port 60, or the like to facilitate communication through a computer network 62. Internally, one or more busses 64 may operably interconnect various components 44, 46, 54, 56, 58, 60 of a node 42 to provide communication therebetween. In certain embodiments, various nodes 42 of a computer system 40 may contain more or less of the components 44, 46, 54, 56, 58, 60, 64 described hereinabove.

Different nodes 42 within a computer system 40 may perform difference functions. For example, one or more nodes 42 within a system 40 may function as or be master nodes 42. Additionally, one or more nodes 42 within a system 40 may function as or be worker nodes 42. Accordingly, a system 40 may include one or more master nodes 42 distributing work to one or more worker nodes 42. In selected embodiments, a system 40 may also include one or more nodes 42 that function as or are routers 66 and the like. Accordingly, one computer network 62 may be connected to other computer networks 68 via one or more routers 66.

Figure 7:
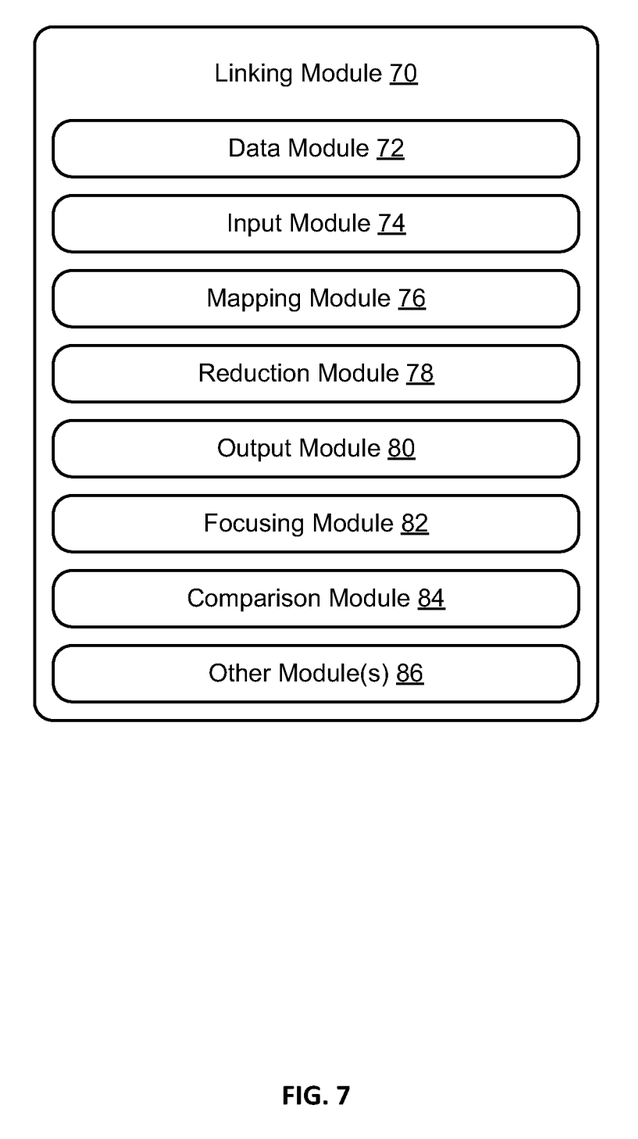
FIG. 7 is an illustration of a linking module.

Referring to FIG. 7, a computer system 40 may process records 10 in any suitable manner. In selected embodiments, the nature of the hardware and/or software of a computer system 40 may reflect the specific processing to be performed. For example, a computer system 40 configured to compare and link records 10 may include a linking module 70 providing, enabling, or supporting such functionality.

A linking module 70 in accordance with the present invention may include any suitable arrangement of sub-components or modules. In certain embodiments, a linking module 70 may include a data module 72, input module 74, mapping module 76, reduction module 78, output module 80, focusing module 82, comparison module 84, one or more other modules 86 as desired or necessary, or the like or some combination or sub-combination thereof.

In selected embodiments, certain components or modules of a linking module 70 may be associated more with nodes 42 of a certain type. For example, a data module 72, input module 74, mapping module 76, reduction module 78, and output module 80 may be primarily or exclusively associated with one or more master nodes 42. Conversely, a focusing module 82 and comparison module 84 may be primarily or exclusively associated with one or more worker nodes 42.

A data module 72 may contain information supporting the operation of a linking module 70. In selected embodiments, a data module 72 may contain or store one or more records 10. For example, a data module 72 may contain one or more records 10 comprising customer profiles from one or more sources. A data module 72 may also contain data, information, results, or the like produced by a linking module 70 of one or more components or modules thereof. For example, a data module 72 may contain a list of focused blockers. A data module 72 may also contain linking information identifying which records 10 correspond to the same individual, household, or the like.

An input module 74 may generate, collect, extract, receive, communicate, and/or process any inputs (e.g., instructions, information, etc.) needed or used by a linking module 70. For example, an input module 74 may receive a command or instruction to begin processing records 10. Accordingly, in selected embodiments, an input module 74 may be responsible for initiating a linking analysis or process. Alternatively, or in addition thereto, an input module 74 may collect, receive, extract, or communicate one or more records 10 that may be used or processed by one or more other components or modules of a linking module 70.

A mapping module 76 may control the flow of instructions, records 10, keys, or the like or combinations or sub-combinations thereof from one or more master nodes 42 to one or more worker nodes 42. For example, a mapping module 76 may take an appropriate input, divide it into smaller sub-problems, and distribute them to a plurality of worker nodes 42. In selected embodiments, a mapping module 76 may enable one or more worker nodes 42 to take an input, divide it into smaller sub-problems, and distribute them to still other worker nodes 42, leading to a multi-level tree structure.

Once the various worker nodes 42 have finished processing their respective workloads, the results may be passed back to one or more master nodes 42. This process may be controlled or facilitated by a reduction module 78. Alternatively, or in addition thereto, a reduction module 78 may control the assimilation or reduction of the results produced by one or more worker nodes 42. That is, a reduction module 78 may collect the answers to all the various sub-problems and combine them in some way to form a desired output.

An output module 80 may generate, collect, compile, send, communicate, and/or process any outputs of a linking module 70. For example, in selected embodiments, an output module 80 may receive linking information (e.g., from an reduction module 78), passing linking information to a data module 72 for storage, modify one or more records 10 in accordance with linking information, or the like or a combination or sub-combination thereof.

A focusing module 82 may receive focused blockers and may analyze customer records 10 from a group 30 of customer records 10 according to the focused blockers to produce focused block keys 32 and associate these keys with the relevant customer record 10 which produces the key. The focusing module 82 may identify records 10 which correspond to the focused block key 32 and may create focused groups 34 containing records 10 corresponding to the particular focused block key 32.

A comparison module 84 may receive customer records 10A, 10B and compare the customer records to determine if the customer records are linked records 12. The comparison module 84 may receive customer records 10 from a focused group 34 and compare pairs of records 10 from within the focused group 34 to identify linked records 12. Additionally, the linking module 70 may include one or more other modules 86 as may be necessary or desirable to compare the records 10 and identify linked records 12.

Figure 8:
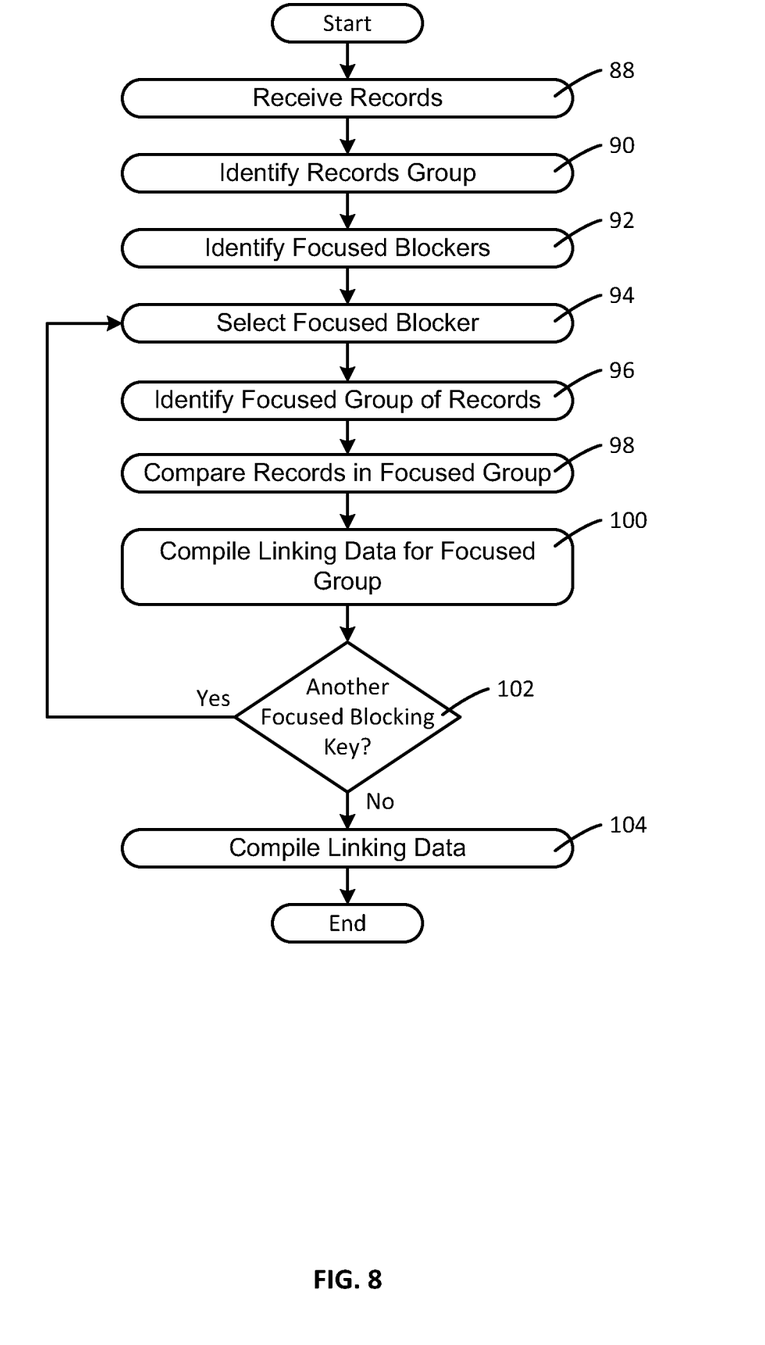
FIG. 8 is a flowchart illustration of comparing customer records.

Referring now to FIG. 8, a flowchart illustrating a computer system 40 comparing customer records 10 is shown. The flowchart in FIG. 8 illustrates the architecture, functionality, and operation of possible implementations of systems, methods, and computer program products according to certain examples. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A computer system 40 may receive 88 or identify customer records 10. These customer records 10 may include one or more groups 20, 22, 24, 26, 28 of customer records 10 which may be obtained from various different sources. It will be appreciated that, in some instances millions or even billions of records 10 may be present. The computer system 40 may identify 90 a records group 30 which is to be compared. The records group 30 may include all records 10 from available records groups 20, 22, 24, 26, 28 or may include a smaller subset of records, such as one group 26 according to the purpose in comparing the records 10.

The computer system 40 may identify 92 one or more focused blockers. The focused blockers may be used in comparing the group 30 of records 10 to reduce the computational load and accurately provide linked records 12. The computer system 40 may then select 94 a focused blocker from among the focused blockers. The computer may then identify 96 a focused group 34A, etc. of records 10. The focused group 34A of records 10 is identified as records 10 from the records group 30 which pertain to focused blocker keys 32A resulting from application of a corresponding focused blocker to the target group 30 of customer records 10. The computer system 40 may analyze the records 10 in the target records group 30 to determine if each individual record pertains to the focused blocker and results in a focused blocker key 32A. The focused blocker and focused blocker key 32A may often pertain to one or more data fields 18 within the record. As such, the computer system 40 may analyze only the relevant data fields 18 (e.g. 18A, 18B, etc.) from a record 10 to determine if the data contained within the data field 18 matches the data value pertaining to the focused blocker.

In some examples, a focused blocker may pertain to single data values corresponding to data fields 18. For example, the focused blocker may server to identify records 10 which pertain to a customer who is between the ages of 45 and 55 and who lives with family members. In some examples, a focused blocker may pertain to a data field 18 which may include many different data values. A focused blocker may seek to group all records 10 within the same zip code. Rather than specify particular zip codes, the focused blocker may specify that focused blocking keys 32 comprising zip codes are produced from records 10 and that customer records with identical zip codes are to be grouped together into a focused group 34. Such a focused blocker may result in many focused groups 34 with each record 10 within a focused group 34 having the same data value(s) 18 specified by the focused blocker.

The computer system 40 may compare 98 records 10 within a focused group 34 of records 10. In comparing records 10 from the focused group 34, the computer system may select two records 10A, 10B and compare data from data fields 18 within the records to determine if the two records are linked (i.e. pertain to a single customer, household, business, etc.) or are not linked. The computer system may use fuzzy logic or the like to compare the data values 18.

If the records 10A, 10B should be linked, the computer system may identify these records as linked records 12 or otherwise compile 100 linking data resulting from the focused group 34. The computer system 40 may then decide 102 if another focused blocker should be applied to the group 30 of records. If another focused blocker remains, the computer system 40 may again select 94 another focused blocker and proceed as discussed, producing focused blocking keys 32 and producing value pairs with the (focused block key; record), grouping these records into focused groups 34 and comparing customer records 10 which have the same focused block keys 32. If there are no remaining focused blockers 32, the computer system may compile 104 linking information for the group 30 of records 10. The linking data may then be presented 106 to a user or otherwise analyzed as desired.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer-implemented method comprising:
  a computer system identifying a target group of electronic customer records, each electronic customer record having data fields containing data pertaining to a customer;
  the computer system, at one or more master nodes, using a mapping system to divide linking tasks into sub-tasks that are distributed to worker nodes in a multi-level tree structure for parallel processing;
  the computer system, at one or more first worker nodes of the worker nodes, identifying a first focused blocker, the first focused blocker identifying a data value for an electronic customer record data field;
  the computer system analyzing one or more electronic customer records from within the target group of electronic customer records to, for each electronic customer record within the target group of electronic customer records, identify one or more first focused blocker keys, the one or more first focused blocker keys comprising one or more data values from the each electronic customer record of the target group of electronic customer records corresponding to the data value for the electronic customer record data field;
  the computer system further analyzing the one or more electronic customer records from within the target group of electronic customer records, and producing one or more additional focused blocker keys based from the further analysis;
  the computer system associating the one or more additional focused blocker keys with the one or more electronic customer records from within the target group of electronic customer records;
  the computer system, at the one or more first worker nodes of the worker nodes, analyzing the target group of electronic customer records to identify a first focused group of electronic customer records, the first focused group of electronic customer records comprising:
    electronic customer records comprising a first focused blocker data value; and
    electronic customer records associated with at least one of the one or more additional focused blocker keys;
  the computer system, at the one or more first worker nodes of the worker nodes, comparing pairs of electronic customer records from the first focused group of electronic customer records to identify linked records, each linked record comprising two or more electronic customer records which pertain to a single customer entity;
  in parallel to the computer system identifying the first focused blocker, the computer system, at one or more second worker nodes of the worker nodes, identifying a second focused blocker, the second focused blocker identifying a third data value for the electronic customer record data field, wherein the third data value is different than the data value identified by the first focused blocker for the electronic customer record data field;
  in parallel to the computer system analyzing the target group of electronic customer records to identify the first focused group of electronic customer records, the computer system, at the one or more second worker nodes of the worker nodes, analyzing the target group of electronic customer records to identify a second focused group of electronic customer records, the second focused group of electronic customer records comprising electronic customer records comprising the third data value; and
  in parallel to the computer system comparing the pairs of electronic customer records from the first focused group of electronic customer records, the computer system, at the one or more second worker nodes of the worker nodes, comparing pairs of electronic customer records from the second focused group of electronic customer records to identify second linked records, each linked record of the second linked records comprising two or more electronic customer records which pertain to a second single customer entity; and
  the computer system, at the one or more master nodes, using a reduction system to receive and combine responses from the worker nodes for output.

2. The method of claim 1, wherein the first focused blocker value comprises a first data value for a first electronic customer record data field and a second data value for a second electronic customer record data field.

3. The method of claim 2, wherein the first focused group of electronic customer records further comprises electronic customer records comprising the first data value and the second data value, the data value comprising the first and second data values.

4. The method of claim 2, wherein the first focused blocker identifies the first data value and the second data value selected from a group consisting of:
  a double metaphone of a last name and a zip code;
  the last name and the zip code;
  the last name and a house number; and
  the house number and the zip code.

5. The method of claim 1, wherein the target group of electronic customer records comprises a first group of electronic customer records obtained from a first source and a second group of electronic customer records obtained from a second source.

6. The method of claim 1, wherein the single customer entity is selected from a group consisting of:
  a single customer;
  a household; and
  a business.

7. The method of claim 1, wherein the method further comprises the computer system comparing all possible pairs of electronic customer records from the first focused group of electronic customer records to identify the linked records.

8. The method of claim 1, wherein:
  the first focused blocker data value comprises a first data value for a first electronic customer record data field and a second data value for a second electronic customer record data field;
  the first focused group of electronic customer records further comprises electronic customer records comprising the first data value and the second data value;
  the first focused blocker identifies the first data value and the second data value selected from a group consisting of:
    a double metaphone of a last name and a zip code;
    the last name and the zip code;
    the last name and a house number; and
    the house number and the zip code;

the target group of electronic customer records comprises a first group of electronic customer records obtained from a first source and a second group of electronic customer records obtained from a second source; and the single customer entity is selected from a group consisting of:
a single customer;
a household; and
a business.

9. The method of claim 1, further comprising:
the computer system collecting information based at least in part on the linked records; and
the computer system modifying one or more of the one or more electronic customer records based at least in part on the information.

10. A computer-implemented method comprising:
a computer system identifying a target group of electronic records, each electronic record having data fields containing data pertaining to one or more events;
the computer system, at one or more master nodes, using a mapping system to divide linking tasks into sub-tasks that are distributed to worker nodes in a multi-level tree structure for parallel processing;
the computer system, at one or more first worker nodes of the worker nodes, identifying a first focused blocker, the first focused blocker identifying a data value for an electronic record data field;
the computer system analyzing one or more electronic records from within the target group of electronic records to, for each electronic customer record within the target group of electronic records, identify one or more first focused blocker keys, the one or more first focused blocker keys comprising one or more data values from the each electronic customer record of the target group of electronic records corresponding to the data value for the electronic record data field;
the computer system further analyzing the one or more electronic records from within the target group of electronic records, and producing one or more additional focused blocker keys based from the further analysis;
the computer system associating the one or more additional focused blocker keys with the one or more electronic records from within the target group of electronic records;
the computer system, at the one or more first worker nodes of the worker nodes, analyzing the target group of electronic records to identify a first focused group of electronic records, the first focused group of electronic records comprising:
electronic records comprising a first focused blocker data value; and
electronic records associated with at least one of the one or more additional focused blocker keys;
the computer system, at the one or more first worker nodes of the worker nodes, comparing pairs of electronic records from the first focused group of electronic records to identify linked records, each linked record comprising two or more electronic records which pertain to a single event of the one or more events;
in parallel to the computer system identifying the first focused blocker, the computer system, at one or more second worker nodes of the worker nodes, identifying a second focused blocker, the second focused blocker identifying a third data value for the electronic record data field, wherein the third data value is different than the data value identified by the first focused blocker for the electronic record data field;
in parallel to the computer system analyzing the target group of electronic records to identify the first focused group of electronic records, the computer system, at the one or more second worker nodes of the worker nodes, analyzing the target group of electronic records to identify a second focused group of electronic customer records, the second focused group of electronic customer records comprising electronic customer records comprising the third data value;
in parallel to the computer system comparing the pairs of electronic records from the first focused group of electronic records, the computer system, at the one or more second worker nodes of the worker nodes, comparing pairs of electronic records from the second focused group of electronic customer records to identify second linked records, each linked record of the second linked records comprising two or more electronic customer records which pertain to a second single customer entity; and
the computer system, at the one or more master nodes, using a reduction system to receive and combine responses from the worker nodes for output.

11. The computer-implemented method of claim 10, wherein:
the first focused blocker data value comprises a first data value for a first electronic record data field and a second data value for a second electronic record data field;
the first focused group of electronic records further comprises electronic records comprising the first data value and the second data value; and
the target group of electronic records comprises a first group of electronic records obtained from a first source and a second group of electronic records obtained from a second source.

12. The computer-implemented method of claim 10, further comprising:
collecting information based at least in part on the linked records; and
modifying one or more of the one or more electronic records based at least in part on the information.

13. A computer system comprising:
a computer system comprising a hardware processor, the computer system programmed to:
identify a target group of electronic customer records, each electronic customer record having data fields containing data pertaining to a customer;
use a mapping system, at one or more master nodes, to divide linking tasks into sub-tasks that are distributed to worker nodes in a multi-level tree structure for parallel processing;
identify, at one or more first worker nodes of the worker nodes, a first focused blocker, the first focused blocker identifying a data value for an electronic customer record data field;
analyze one or more electronic customer records from within the target group of electronic customer records to, for each electronic customer record within the target group of electronic customer records, identify one or more first focused blocker keys, the one or more first focused blocker keys comprising one or more data values from the each electronic customer record of the target group of electronic customer records corresponding to the data value for the electronic customer record data field;

further analyze the one or more electronic customer records from within the target group of electronic customer records, and producing one or more additional focused blocker keys based from the further analysis;

associate the one or more additional focused blocker keys with the one or more electronic customer records from within the target group of electronic customer records;

analyze, at the one or more first worker nodes of the worker nodes, the target group of electronic customer records to identify a first focused group of electronic customer records, the first focused group of electronic customer records comprising:
 electronic customer records comprising a first focused blocker data value; and
 electronic customer records associated with at least one of the one or more additional focused blocker keys;

compare, at the one or more first worker nodes of the worker nodes, pairs of electronic customer records from the first focused group of electronic customer records to identify linked records, each linked record comprising two or more electronic customer records which pertain to a single customer entity;

in parallel to identifying the first focused blocker, identify, at one or more second worker nodes of the worker nodes, a second focused blocker, the second focused blocker identifying a third data value for the electronic customer record data field, wherein the third data value is different than the data value identified by the first focused blocker for the electronic customer record data field;

in parallel to analyzing the target group of electronic customer records to identify the first focused group of electronic customer records, analyze, at the one or more second worker nodes of the worker nodes, the target group of electronic customer records to identify a second focused group of electronic customer records, the second focused group of electronic customer records comprising electronic customer records comprising the third data value;

in parallel to comparing the pairs of electronic customer records from the first focused group of electronic customer records, compare, at the one or more second worker nodes of the worker nodes, pairs of electronic customer records from the second focused group of electronic customer records to identify second linked records, each linked record of the second linked records comprising two or more electronic customer records which pertain to a second single customer entity; and using a reduction system, at the one or more master nodes, to receive and combine responses from the worker nodes for output.

14. The system of claim 13, wherein the first focused blocker data value comprises a first data value for a first electronic customer record data field and a second data value for a second electronic customer record data field.

15. The system of claim 14, wherein the first focused group of electronic customer records further comprises electronic customer records comprising the first data value and the second data value, the data value comprising the first and second data values.

16. The system of claim 13, wherein the target group of electronic customer records comprises a first group of electronic customer records obtained from a first source and a second group of electronic customer records obtained from a second source.

17. The system of claim 13, wherein the single customer entity is selected from a group consisting of:
 a single customer;
 a household; and
 a business.

18. The system of claim 14, wherein the first focused blocker identifies the first data value and the second data value selected from a group consisting of:
 a double metaphone of a last name and a zip code;
 the last name and the zip code;
 the last name and a house number; and
 the house number and the zip code.

19. The system of claim 13, wherein the computer system is further programmed to compare all possible pairs of electronic customer records from the first focused group of electronic customer records to identify the linked records.

20. The system of claim 13, wherein:
 the first focused blocker data value comprises a first data value for a first electronic customer record data field and a second data value for a second electronic customer record data field;
 the first focused group of electronic customer records further comprises electronic customer records comprising the first data value and the second data value;
 the first focused blocker identifies the first data value and the second data value selected from a group consisting of:
  a double metaphone of a last name and a zip code;
  the last name and the zip code;
  the last name and a house number; and
  the house number and the zip code;
 the target group of electronic customer records comprises a first group of electronic customer records obtained from a first source and a second group of electronic customer records obtained from a second source; and
 the single customer entity is selected from a group consisting of:
  a single customer;
  a household; and
  a business.

21. The system of claim 13, wherein:
 the computer system is further programmed to:
  collect information based at least in part on the linked records; and
  modifying one or more of the one or more electronic customer records based at least in part on the information.

* * * * *